US012749236B2

(12) United States Patent
Kumar Agrawal et al.

(10) Patent No.: US 12,749,236 B2
(45) Date of Patent: Sep. 29, 2026

(54) METHODS, SYSTEMS, AND DEVICES FOR ALTERING IMAGES CAPTURED BY AN ELECTRONIC DEVICE FOR CULTURAL AND ENVIRONMENTAL CONTEXTUALIZATION

(71) Applicant: Motorola Mobility LLC, Chicago, IL (US)

(72) Inventors: Amit Kumar Agrawal, Bangalore (IN); Rahul Bharat Desai, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 19/043,131

(22) Filed: Jan. 31, 2025

(65) Prior Publication Data

US 2026/0228939 A1 Aug. 6, 2026

(51) Int. Cl.

| | |
|---|---|
| ***G06T 11/10*** | (2026.01) |
| ***G06V 10/44*** | (2022.01) |
| ***G06V 20/60*** | (2022.01) |
| ***G06V 40/10*** | (2022.01) |
| ***H04N 23/611*** | (2023.01) |
| ***H04N 23/63*** | (2023.01) |

(52) U.S. Cl.

CPC .............. *G06T 11/10* (2026.01); *G06V 10/44* (2022.01); *G06V 20/60* (2022.01); *G06V 40/10* (2022.01); *H04N 23/611* (2023.01); *H04N 23/632* (2023.01); *G06T 2200/24* (2013.01)

(58) Field of Classification Search

CPC ........ G06T 11/10; G06V 40/10; G06V 10/44; G06V 20/60; H04N 23/632; H04N 23/611

See application file for complete search history.

(56) References Cited

U.S. PATENT DOCUMENTS

| | | | |
|---|---|---|---|
| 7,519,200 B2 * | 4/2009 | Gokturk | G06F 16/50 382/118 |
| 9,830,727 B2 | 11/2017 | Henry et al. | |
| 2016/0071321 A1 * | 3/2016 | Nishiyama | G06T 19/00 345/632 |
| 2018/0060706 A1 * | 3/2018 | Allen | G06V 40/16 |
| 2024/0144520 A1 * | 5/2024 | Gori | G06T 7/73 |
| 2024/0203009 A1 * | 6/2024 | Kristal | G06Q 30/0643 |
| 2025/0103748 A1 | 3/2025 | Agrawal | |
| 2025/0111086 A1 | 4/2025 | Agrawal et al. | |
| 2025/0265863 A1 * | 8/2025 | Liong | G06V 10/12 |

OTHER PUBLICATIONS

Garg, Ankita , "Google's cool Magic Eraser Tool now accessible on any iPhone or Android phone, here is how", Published Mar. 6, 2023; Available online at https://www.indiatoday.in/technology/news/story/googles-cool-magic-eraser-tool-now-accessible-on-any-iphone-or-android-phone-here-is-how-2343299-2023-03-06.

* cited by examiner

*Primary Examiner* — Mishawn N. Hunter
(74) *Attorney, Agent, or Firm* — Philip H. Burrus, IV

(57) ABSTRACT

An electronic device includes a user interface, an image capture device, a location detector, and one or more processors. The image capture device is configured to capture images of multiple persons within the environment of the electronic device. The location detector determines the geographic location at the time the image is captured. The processors identify whether one or more persons in the image are wearing a regionally traditional item of dress associated with the location, while at least one other person is not. The processors then cause the user interface to present a prompt facilitating the replacement of attire worn by the at least one person with another regionally traditional item of dress.

20 Claims, 7 Drawing Sheets

METHODS, SYSTEMS, AND DEVICES FOR ALTERING IMAGES CAPTURED BY AN ELECTRONIC DEVICE FOR CULTURAL AND ENVIRONMENTAL CONTEXTUALIZATION

BACKGROUND

Technical Field

This disclosure relates generally to electronic devices, and more particularly to electronic devices having image capture devices.

BACKGROUND ART

In the realm of digital photography, the ability to capture and enhance images has evolved significantly with the advent of advanced processing technologies. Modern techniques allow for the manipulation of photos to add or remove elements, thereby altering the original depiction of reality. However, these methods often require manual intervention, as current systems lack the capability to intuitively understand the user's intent, particularly in the context of cultural and environmental settings. It would be advantageous to have improved methods, systems, and devices overcoming these shortcomings.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
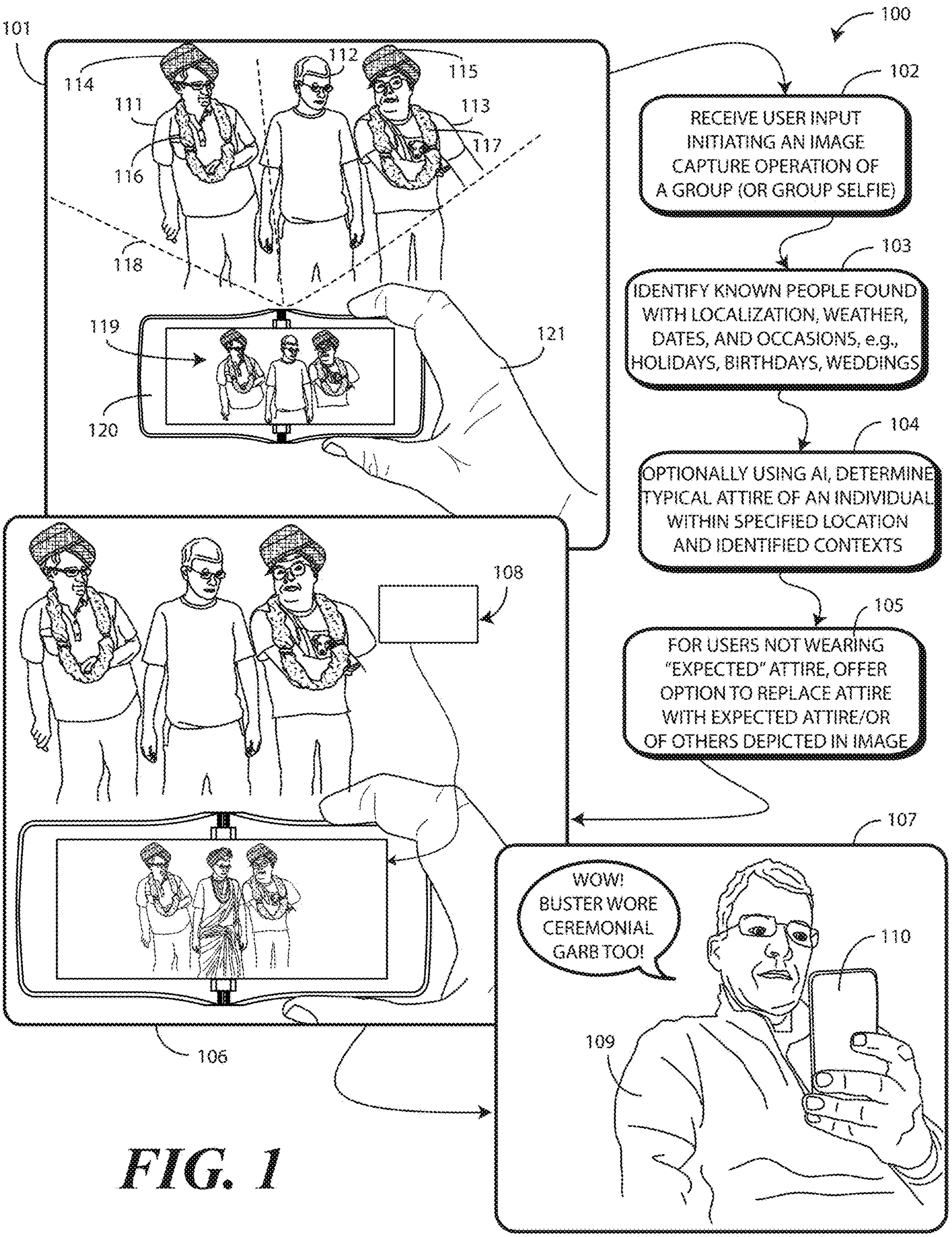
FIG. 1 illustrates one explanatory method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to capturing, with an image capture device, one or more images of an environment of the electronic device, detecting, using one or more processors, multiple persons being depicted in the one or more images, determining, by the one or more processors, at least one person of the multiple persons being depicted wearing a culture heritage garment while at least one other person of the multiple persons fails to wear a corresponding culture heritage garment, and presenting, by the one or more processors on a user interface, a prompt facilitating cultural enhancement of the one or more images. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of using one or more processors to, when the one or more processors identify one or more persons of the multiple persons being depicted wearing regionally traditional item of dress associated with the location and at least one person of the multiple persons failing to wear a corresponding regionally traditional item of dress associated with the location, cause the user interface to present a prompt facilitating replacement of items of dress worn by the at least one person with another regionally traditional item of dress as described herein. The non-processor circuits may include, but are not limited to, a radio receiver, a radio transmitter, signal drivers, clock circuits, power source circuits, and user input devices.

As such, these functions may be interpreted as steps of a method to perform receiving, by one or more processors, at least one image depicting at least one person wearing a culturally identifiable item of clothing associated with a culture residing at a location where the at least one image is captured and at least one other person failing to wear any culturally identifiable items associated with the culture, identifying, by the one or more processors, another culturally identifiable item of clothing associated with the culture, and in response to user input received by a user interface requesting alteration of the at least one image, causing, by the one or more processors, the at least one image to depict the at least one other person wearing the another culturally identifiable item of clothing. Alternatively, some or all functions could be implemented by a state machine that has no stored program instructions, or in one or more application specific integrated circuits (ASICs), in which each function or some combinations of certain of the functions are implemented as custom logic.

Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent.

The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

A "culturally recognized garment" refers to a garment that is widely acknowledged within a specific culture as representative of traditional or customary attire. A "culture heritage garment" refers to a garment that embodies the traditional clothing styles passed down through generations within a particular cultural group.

A "regionally traditional garment" refers to a garment that is typically worn in a specific geographic area and is associated with the cultural practices of that region. A "culturally identifiable garment" refers to a garment that is easily associated with a particular culture due to its distinctive design, patterns, or materials. As used herein, "cultural attire" refers to garments customarily worn during cultural events, ceremonies, or celebrations, reflecting the customs and traditions of a specific cultural group.

As noted above, in the realm of digital photography, the ability to capture and enhance images has evolved significantly with the advent of advanced processing technologies. While modern techniques allow for the manipulation of photos to add or remove elements, thereby altering the original depiction of reality, these methods often require manual intervention. This is true because current systems lack the capability to intuitively understand the user's intent, particularly in the context of cultural and environmental settings.

Embodiments of the disclosure contemplate that these limitations become evident in scenarios where individuals wish to reflect cultural attire or environmental context in their photographs. There is currently no solution providing an automated or contextually aware method to achieve cultural contextualization of images lacking the same.

Thus, despite advancements in technology, there remains a gap in the ability to seamlessly integrate cultural and environmental elements into images. Current methods do not adequately address the need for automatic enhancement of images based on location-specific cultural attire and environmental conditions. This shortcoming highlights the requirement for a more sophisticated approach that leverages technology to understand and apply cultural and contextual cues, thereby enhancing the user's experience and preserving the authenticity of the captured moment.

Embodiments of the disclosure contemplate that, in the realm of digital photography, capturing images that accurately reflect the cultural and environmental context of an event or location has become increasingly significant. As individuals participate in diverse cultural events, the desire to preserve these moments authentically in photographs is of great importance. However, traditional photography fails to capture the essence of such events, particularly when individuals are not dressed in attire that aligns with the cultural or environmental context. This disconnect can lead to images that do not fully convey the intended experience or sentiment of the occasion.

Illustrating by example, even current state-of-the-art artificial intelligence image processing techniques that add or remove elements, including altering attire or backgrounds, lack the capability to intuitively understand the user's intent or the cultural significance of the attire. These methods typically require manual intervention, which can be time-consuming and may not consistently yield results that are culturally accurate or sensitive. Furthermore, existing solutions do not leverage contextual data such as location, weather, or cultural events to enhance the image automatically, leaving a gap in the ability to seamlessly integrate cultural and environmental elements into photographs.

Advantageously, embodiments of the disclosure address these shortcomings by introducing a technique to automatically enhance images based on location and cultural correlation. By utilizing advanced artificial intelligence models trained on social media posts and web-scraped data, the method determines the typical attire for a specific location, weather condition, and date. This advantageously allows the system to identify whether individuals in a photograph are wearing attire that aligns with the cultural context of the event. If discrepancies are detected, the system offers options to replace or adjust the attire to better fit the cultural setting, thereby enhancing the overall authenticity and sentiment of the captured moment. This approach not only streamlines the process of cultural contextualization in photography but also ensures that the images reflect the true essence of the event or location.

Illustrating by example, in one or more embodiments a method relates to a process implemented in an electronic device for enhancing images by incorporating cultural and environmental contextualization. In one or more embodiments, the method involves capturing one or more images of an environment using an image capture device integrated within the electronic device.

In one or more embodiments, upon capturing the images, the device's processors detect multiple persons depicted within these images. The processors then determine if at least one person is wearing a cultural heritage garment while at least one other person is not wearing a corresponding cultural heritage garment. In response to this determination, in one or more embodiments the processors present a prompt on the user interface of the electronic device, facilitating the cultural enhancement of the images. This enhancement may involve altering the images to depict the person not wearing the cultural heritage garment in attire that aligns with the cultural context, thereby ensuring the image reflects the cultural and environmental setting accurately.

The operational principle of this method is the integration of image capture and processing technologies with cultural data to automatically identify discrepancies in cultural attire among individuals in a photograph. By using processors to detect and analyze the attire of individuals, the system can advantageously determine cultural mismatches and offer users the option to adjust the attire to better fit the cultural context. This approach reduces the need for manual intervention, which is often required in traditional image editing methods, and provides a more seamless and efficient way to enhance images.

The power of this method lies in the ability to automatically recognize cultural attire and suggest enhancements based on contextual data such as location, weather, and cultural events. This represents a significant improvement over existing solutions that do not utilize such contextual information and require manual adjustments. The practical application of the method is evident in scenarios where users wish to preserve the cultural authenticity of an event in photographs, ensuring that the images accurately reflect the cultural and environmental setting.

By presenting a prompt for cultural enhancement, the method provides users with an intuitive interface to make adjustments, thereby improving the user experience and ensuring that the images convey the intended cultural significance. This capability is particularly useful in multicultural settings where individuals may not be familiar with the appropriate attire, allowing for a more inclusive and culturally sensitive representation in photographs.

In one or more embodiments, an electronic device comprises a user interface, an image capture device, a location detector, and one or more processors operable with these components. The image capture device is configured to capture at least one image of multiple persons situated within the environment of the electronic device.

In one or more embodiments, the location detector determines the geographic location of the electronic device at the time the image is captured. The processors, upon identifying that one or more persons depicted in the image are wearing a regionally traditional item of dress associated with the determined location while at least one other person is not wearing a corresponding regionally traditional item of dress, cause the user interface to present a prompt.

In one or more embodiments, this prompt facilitates the replacement of the attire worn by the at least one person with another regionally traditional item of dress, thereby ensuring cultural consistency within the image. This embodiment leverages the integration of location data and image processing to enhance the cultural authenticity of captured images, providing users with an intuitive means to adjust attire in photographs to align with regional cultural norms.

Advantageously, this arrangement allows for the automatic identification and suggestion of attire adjustments based on regional cultural norms, enhancing the cultural authenticity of images. By integrating location data with image processing, the system can accurately determine cultural attire mismatches and provide users with an intuitive means to adjust attire in photographs.

Advantageously, this reduces the need for manual editing and ensures that images reflect the cultural context of the location, improving the user experience by providing culturally sensitive and contextually appropriate image enhancements. The use of a location detector in conjunction with image processing capabilities represents a novel approach to addressing cultural attire discrepancies in digital photography.

In one or more embodiments, a method in an electronic device involves receiving, by one or more processors, at least one image depicting at least one person wearing a culturally identifiable item of clothing associated with a culture residing at a location where the image is captured, while at least one other person in the image fails to wear any culturally identifiable items associated with the culture. In one or more embodiments, the processors are configured to identify another culturally identifiable item of clothing associated with the culture.

In one or more embodiments, this identification process may involve accessing, with a communication device, one or more Internet-stored images and/or social media posts that are associated with the culture, thereby leveraging a vast repository of cultural data to ensure accuracy and relevance. In response to user input received via a user interface requesting alteration of the image, the processors cause the image to depict the at least one other person wearing the identified culturally identifiable item of clothing. This process ensures that the image reflects the cultural context accurately, enhancing the authenticity and sentiment of the captured moment.

Advantageously, by utilizing online resources, the system can dynamically update its database of cultural garments, allowing for real-time adaptation to evolving cultural trends and maintaining that the attire suggestions are current and contextually appropriate. This method enhances the device's ability to provide culturally sensitive image alterations, reducing the likelihood of cultural insensitivity or inaccuracies.

Additionally, by automating the identification process, the method minimizes the need for manual input, streamlining the user experience and maintaining that the images reflect the cultural context accurately. This capability is particularly beneficial in multicultural environments where users may not be familiar with the appropriate attire, thus promoting inclusivity and cultural awareness in digital photography. Other advantages offered by embodiments of the disclosure will be described below. Still others will be obvious to those of ordinary skill in the art having the benefit of this disclosure.

Turning now to FIG. 1, illustrated therein is one explanatory method in accordance with one or more embodiments of the disclosure. At step 101 of FIG. 1, a person named Buster 112 finds himself in a distinctive cultural setting, meeting with two high-level executives, Jacob 111 and Eric 113, for an important cultural event. The executives, in a show of respect and appreciation for the local customs, are adorned in culture heritage garments, which include headwear in the form of turbans 114, 115 and neckwear in the form of leis 116, 117. In this example, the culture heritage garments comprise regionally traditional garments, which symbolize their connection to the cultural heritage of the region.

However, Buster 112 is scheduled to deliver a presentation shortly thereafter to an international audience on Barry Harris's scales of chords-encompassing the sixth diminished scale, the minor sixth diminished scale, the dominant seventh diminished scale, and the dominant seventh flat five diminished scale. As such, Buster 112 opts not to wear the cultural garments. He is acutely aware that such attire might not resonate with his global audience, who may not grasp the cultural significance of turbans and leis. This decision, though practical, leaves Jacob 111 and Eric 113 somewhat dismayed, as Buster 112 stands out starkly against the backdrop of cultural unity they represent.

Despite this cultural mismatch, Jacob 111 and Eric 113, embodying the spirit of inclusivity and understanding, agree to take at least one image 118 with Buster 112. In the image, Buster 112, with his jazz beatnik appearance, seems out of place, a stark contrast to the harmonious cultural tableau presented by the executives. This once-in-a-lifetime photograph 119, displayed on the electronic device 120, captures a moment of disconnection, with Buster 112 appearing as though he is indifferent to the local customs.

This visual discord is not lost on Buster 112, who feels a pang of regret for not blending in with the cultural milieu. The image serves as a poignant reminder of the cultural divide, leaving Buster 112 with a sense of longing to have been part of the cultural tapestry woven by Jacob 111 and Eric 113.

Fortunately for Buster 112, this malaise is short lived, as the electronic device 120 depicted in FIG. 1 is configured in accordance with one or more embodiments of the disclosure. When the photographer 121 delivers user input to the electronic device 120 to initiate the image capture operation, which is received at step 102, an image capture device of the electronic device 120 initiates a viewfinder mode of operation and, thereafter, captures one or more images 118 of Buster 112, Jacob 111, and Eric 113, who are situated within an environment of the electronic device 120.

It is to be understood that "one or more images" 118 are captured both when the image capture device is operating in the viewfinder mode of operation and when the actual images 119 are captured and stored in memory. When in the preview mode, the one or more images 118 are captured and presented temporarily for the photographer 121 to view on the display, whereas the actual images 119 are more perdurably stored in the memory. This, in one or more embodiments the one or more images are captured while the image capture device is operating in a preview mode of operation.

At step 103, the one or more processors of the electronic device 120 use an image analysis operation on either the preview field of view or the one or more images 118 to detect multiple persons being depicted within the one or more images 118. In one or more embodiments, the one or more processors also determine contextual information associated with the one or more images 118 at step 103. In one or more embodiments, this contextual information includes at least location, weather, dates, and occasions. As will be explained below, in one or more embodiments this contextual information can be used to determine the typical attire expected for the specific conditions.

In one or more embodiments, step 103 involves using the electronic device's processors to gather contextual information about the images 118 captured by the electronic device 120, either during the preview mode of operation or after the photograph(s) 119 are captured. Where these operations are performed, this means the electronic device 120 doesn't just take a picture; the electronic device 120 also collects data about the environment and circumstances surrounding the photo. Here's a simplified explanation of how this process works and what kind of information might be collected In one or more embodiments, the electronic device 120 can use GPS or other location services to determine where the photo is being taken. This helps the device understand the cultural or regional context of the image.

By accessing weather data, the device can determine whether conditions are sunny, rainy, or snowy, which can influence the appearance and mood of the photo. The device can record the date and time the photo is taken. This is useful for identifying if the photo is taken during a specific holiday or event. The device might recognize occasions such as weddings or festivals, either through user input or by analyzing the environment and attire in the image.

In addition to these, here are three other types of contextual information that the device might determine. Knowing whether the time is morning, afternoon, or evening can affect the lighting and colors in the photo and can also suggest different cultural activities or attire.

The device could identify famous landmarks or buildings in the background, which can provide clues about the cultural or historical significance of the location. By recognizing familiar faces or groups of people, the device might infer whether the photo is part of a family gathering, a business meeting, or a casual outing. Other information that the one or more processors of the electronic device 120 can collect along with the one or more images 118 will be obvious to those of ordinary skill in the art having the benefit of this disclosure.

Accordingly, in one or more embodiments step 103 comprises detecting, with one or more sensors of the electronic device, a detected weather condition occurring in the environment of the electronic device, a detected date when the one or more images are being captured, and/or a detected geographic location where the one or more images 118 are being captured.

In one or more embodiments, step 103 comprises the one or more processors determining at least one person of the multiple persons being depicted wearing a culture heritage garment while at least one other person of the multiple persons fails to wear a corresponding culture heritage garment. In this case, the one or more processors determine this, as Jacob 111 and Eric 113 are wearing turbans 114,115 and leis 116,117 while Buster 112 is not.

At step 104, the one or more processors of the electronic device 120 use this information to understand the cultural setting of the one or more images 118. For example, the one or more images 118 are taken at a festival in India, the phone might anticipate people wearing traditional Indian attire.

In one or more embodiments, the one or more processors of the electronic device 120 perform image analysis on the subjects depicted in the one or more images at step 104. In one or more embodiments, the one or more processors of the electronic device 120 check to see if everyone is dressed according to the cultural setting. If someone is not wearing the expected attire, the one or more processors notice this difference at step 104.

At step 105, the one or more processors of the electronic device 120 identify another culturally identifiable item of clothing associated with the culture for the person not wearing cultural attire. In this example, that is Buster 112. In one or more embodiments, the one or more processors identify the another culturally identifiable item by accessing, with a communication device, one or more Internet-stored images and/or social media posts associated with the culture.

In one or more embodiments, the other culture heritage garment matches the culture heritage garment. Illustrating by example, the one or more processors may select a turban that matches the turbans 114,115 worn by Jacob 111 and Eric 113 and a lei that matches the leis 116,117 they wear. Thus, regionally traditional items of dress and selected regionally traditional items of dress would be the same.

In other embodiments, the one or more processors select cultural heritage garments that correspond, or are related, to the culture heritage garments worn by Jacob 111 and Eric 113. Such is the case in FIG. 1, as will be described below with reference to step 105.

In one or more embodiments, step 104 uses an artificial intelligence process to assist with this process. In one or more embodiments, the artificial intelligence process functions as an intelligent assistant that can learn from extensive data. The artificial intelligence process can analyze social media posts or other online images to comprehend what people generally wear in comparable situations.

In one or more embodiments, if the one or more processors of the electronic device 120 identify, at step 103, someone not dressed in the expected cultural attire, the device can propose—or automatically make—modifications to the one or more images 118 at step 105. Illustrating by example, the one or more processors might offer to digitally alter the person's clothes in the photo to align with the cultural setting, making the picture appear more harmonious at step 105. In one or more embodiments, step 105 comprises presenting, by the one or more processors on a user interface, a prompt 108 facilitating cultural enhancement of the one or more images. In one or more embodiments, the prompt 108 facilitates altering the one or more images 118 to cause the at least one other person to be depicted wearing another culture heritage garment.

In one or more embodiments, the prompt 108 is presented only when the at least one person failing to wear the culture heritage garment comprises an authorized user of the electronic device 120. Thus, if the electronic device 120 belonged to Buster 112, and Buster 112 had given the electronic device 120 the photographer 121 with this feature enabled, in one or more embodiments any modification of the one or more images 118 would only occur if Buster 112 were the one devoid of the culture heritage garment.

In other embodiments, the prompt 108 is presented only when the at least one person actually wearing the culture heritage garment comprises an authorized user of the electronic device 120. Thus, if the electronic device 120 belonged to Jacob 111, and he had given the electronic device 120 the photographer 121 with this feature enabled, in one or more embodiments any modification of the one or more images 118 would only occur if Jacob 111 was one of the individuals depicted wearing a culture heritage garment.

At step 106, the one or more processors alter, in response to user input received at the prompt, the one or more images 118 to cause the at least one other person to be depicted wearing the another culture heritage garment. In this example, Buster appears to be depicted in a robe, necklace, and hat that correspond culturally to the turbans 114,115 and leis 116,117 worn by Jacob 111 and Eric 113. While being different, the selected cultural heritage garment is harmonious with, and fits culturally with, these turbans 114,115 and leis 116,117. In simple terms, step 106 uses smart technology to make sure everyone in the photograph 119 looks like they belong to the same cultural event, even if they weren't dressed for the cultural event originally. Advantageously, this allows captured photographs to better capture the spirit of the occasion The alteration of the one or more images 118 occurring at step 106 can occur in various ways. In one or more embodiments, the altering occurring at step 106 comprises superimposing the another culture heritage garment atop depictions of clothing worn by the at least one other person. This is what has happened in the illustrative example of FIG. 1.

In other embodiments, the altering comprises occurring at step 106 replacing depictions of clothing worn by the at least one other person with other depictions of the another culture heritage garment. In still other embodiments, alteration of the one or more images 118 to depict the another culture heritage garment is performed using an artificial intelligence process.

In one or more embodiments, the artificial intelligence process comprises analyzing the one or more images to identify contours and features of one or more individuals depicted in the one or more images. In one or more embodiments, the artificial intelligence process comprises generating a digital model of the culture heritage garment based on the contours and the features.

In one or more embodiments, the artificial intelligence process comprises integrating the digital model into the one or more images to align with the contours and the features of the one or more individuals. In one or more embodiments, the artificial intelligence process comprises adjusting one or more of a color, a texture, and lighting of the digital model to seamlessly integrate with the one or more images, thereby creating a realistic depiction of the another culture heritage garment. As noted above, in one or more embodiments the artificial intelligence process further comprises selecting the another culture heritage garment as a function of one or more of the detected weather conditions, the detected date, the detected geographic location, or detected items depicted in a background of the one or more images.

At step 107, Buster's supervisor 109 is quite pleased Buster 112 elected to wear culturally appropriate garb. Surprised, while looking at his own electronic device 110, he exclaims, "Wow! Buster wore culturally appropriate garb too!" Buster 112 is a cinch for that big raise and promotion now.

Accordingly, the solution presented in FIG. 1 involves a method 100 to automatically enhance one or more images 118 based on location and cultural correlation. The method 100 can optionally leverage advanced artificial intelligence (AI) models.

As described above, in one or more embodiments this method 100 begins by detecting when an image capture device of an electronic device 120 is activated, optionally in a self-photo mode. The one or more processors of the electronic device 120 identify multiple people within the field of view, either during the preview mode of operation or after capturing photographs 119.

In one or more embodiments, the device then combines known individuals with contextual data such as location, weather, dates, and occasions to determine the typical attire expected for the specific conditions. Optionally utilizing a trained artificial intelligence model, the system assesses whether the primary user or any other individuals in the photo are wearing the expected regional attire.

Figure 2:
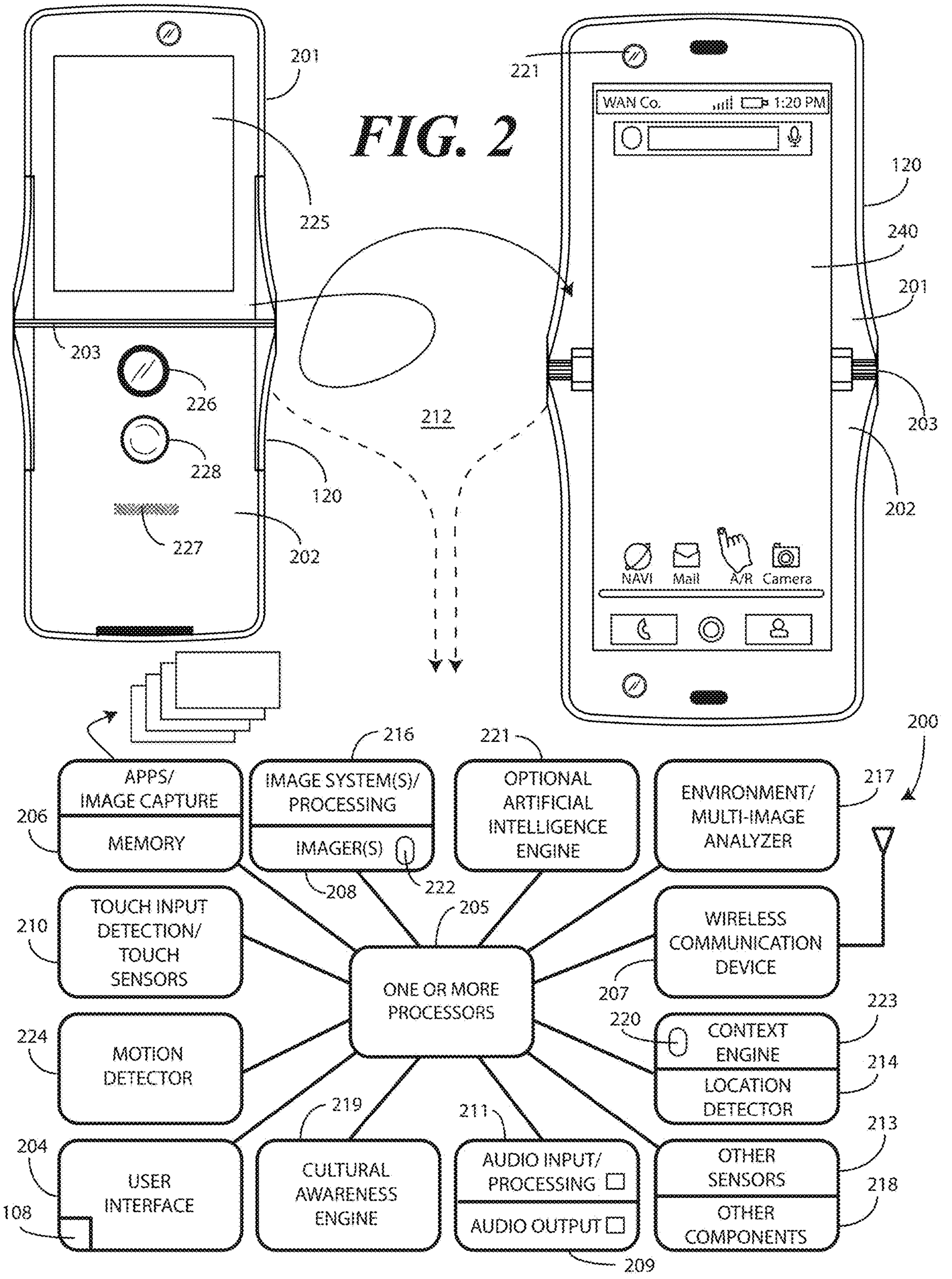
FIG. 2 illustrates one explanatory electronic device in accordance with one or more embodiments of the disclosure.

In one or more embodiments, if discrepancies are found, the system offers options to replace the attire of any person with the expected cultural attire, ensuring that the user fits into the photo in a culturally appropriate manner as shown at step 106. This approach not only enhances the visual harmony of group photos but also preserves the cultural authenticity of the captured moment, providing a seamless and intuitive user experience Turning now to FIG. 2, illustrated therein are more details of one explanatory electronic device 120 configured in accordance with one or more embodiments of the disclosure. While illustrated as a hinged electronic device, the electronic device 120 could include a singular housing that is not deformable and has no hinge, configured in a traditional "candy bar" form factor as well.

Where configured as a candy bar, the display 240 of electronic device 120 would remain exposed and accessible. By contrast, where configured as a hinged device having a first device housing 201 that is selectively pivotable about a hinge 203 relative to the second device housing 202 between a closed position and an axially displaced open position, the display 240 of the electronic device 120 can be selectively concealed and revealed, depending upon whether the electronic device is in the closed position or the axially displaced open position.

The electronic device 120 of FIG. 2 is configured as a portable electronic device, and for illustrative purposes is configured as a smartphone. However, the electronic device 120 could be configured in other ways as well. For example, the electronic device 120 could be configured as a tablet computer, a gaming device, a multimedia player, and so forth. Still other types of electronic devices can be configured in accordance with one or more embodiments of the disclosure as will be readily appreciated by those of ordinary skill in the art having the benefit of this disclosure.

The illustrative electronic device 120 of FIG. 2 includes multiple displays 240,225. A secondary display 225, which can be coupled to either of the first device housing 201 or the second device housing 202, is coupled to the first device housing 201 in this embodiment. This display 225 is considered to be an "exterior" display due to the fact that it is exposed when the first device housing 201 and the second device housing 202 are in the closed position.

The primary display, i.e., display 240, can also be coupled to either or both of the first device housing 201 or the second device housing 202. In this illustrative embodiment, the display 240 is coupled to both the first device housing 201 and the second device housing 202 and spans the hinge 203. In other embodiments, this display 240 can be replaced by two displays, with one coupled to the first device housing 201 and another coupled to the second device housing 202. In either case, this display 240 is considered to be an "interior" display because it is concealed when the first device housing 201 and the second device housing 202 are in the closed position. Either or both of display 240 and/or display 225 can be touch sensitive.

Features can be incorporated into the first device housing 201 and/or the second device housing 202. Examples of such features include an optional camera 226, which was used as the image capture device in the method (100) of FIG. 1, or an optional speaker port 227. Each is shown disposed on the rear side of the electronic device 120 in FIG. 2, but image capture devices could be placed on the front side instead of, or in addition to, camera 226 as well. Illustrating by example, in this illustrative embodiment at least one image capture device 208 is positioned on the front side of the electronic device 120 as well. In this illustrative embodiment, an optional user interface component 228, which may be a button or touch sensitive surface, can also be disposed along the rear side of the second device housing 202.

Also illustrated in FIG. 2 is one explanatory block diagram schematic 200 of one or more components suitable for inclusion the electronic device 120. In one or more embodiments, the block diagram schematic 200 is configured as a printed circuit board assembly disposed within the first device housing 201 and/or second device housing 202 of electronic device 120. Various components can be electrically coupled together by conductors or a bus disposed along one or more printed circuit boards. It should be noted that the block diagram schematic 200 includes many components that are optional, but which are included in an effort to demonstrate how varied electronic devices configured in accordance with embodiments of the disclosure can be.

Thus, it is to be understood that the block diagram schematic 200 of FIG. 2 is provided for illustrative purposes only and for illustrating components of one electronic device 120 in accordance with embodiments of the disclosure. The block diagram schematic 200 of FIG. 2 is not intended to be a complete schematic diagram of the various components required for an electronic device 120. Therefore, other electronic devices in accordance with embodiments of the disclosure may include various other components not shown in FIG. 2 or may include a combination of two or more components or a division of a particular component into two or more separate components and still be within the scope of the present disclosure.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

The illustrative block diagram schematic 200 includes a user interface 204. In one or more embodiments, the user interface 204 includes the display 240, which may optionally be touch sensitive. In one embodiment, users can deliver user input to the display 240 by delivering touch input from a finger, stylus, or other objects disposed proximately with the display 240.

For electronic device 120, since the display 240 spans the hinge 203, it is configured to be flexible. For instance, in one embodiment this display 240 is configured as an organic light emitting diode (OLED) display fabricated on a flexible plastic substrate. This allows the display 240 to be flexible so as to deform when the first device housing 201 pivots about the hinge 203 relative to the second device housing 202. However, it should be noted that other types of displays would be obvious to those of ordinary skill in the art having the benefit of this disclosure. In other embodiments conventional, rigid displays can be disposed to either side of the hinge 203 rather than using a flexible display.

In one embodiment, the display 240 is configured as an active-matrix organic light emitting diode (AMOLED) display. However, it should be noted that other types of displays, including liquid crystal displays, would be obvious to those of ordinary skill in the art having the benefit of this disclosure.

In one embodiment, the electronic device 120 includes one or more processors 205. In one embodiment, the one or more processors 205 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 200. Each of the application processor and the auxiliary processor(s) can be configured to process and execute executable software code to perform the various functions of the electronic device 120 with which the block diagram schematic 200 operates. A storage device, such as memory 206, can optionally store the executable software code used by the one or more processors 205 during operation.

In this illustrative embodiment, the block diagram schematic 200 also includes a communication device 207 that can be configured for wired or wireless communication with one or more other devices or networks. The networks can include a wide area network, a local area network, and/or personal area network. The communication device 207 may also utilize wireless technology for communication, such as, but are not limited to, peer-to-peer or ad hoc communications such as HomeRF, Bluetooth and IEEE 802.11, and other forms of wireless communication such as infrared technology. The communication device 207 can include wireless communication circuitry, one of a receiver, a transmitter, or transceiver, and one or more antennas.

In one embodiment, the one or more processors 205 can be responsible for performing the primary functions of the electronic device with which the block diagram schematic 200 is operational. For example, in one embodiment the one or more processors 205 comprise one or more circuits operable with the user interface 204 to present presentation information to a user. This information can include images and/or video captured by one or more image capture devices 208 of the electronic device 120. Additionally, the one or more processors 205 can be operable with an audio output device 209 to deliver audio output to a user. The executable software code used by the one or more processors 205 can be configured as one or more modules that are operable with the one or more processors 205. Such modules can store instructions, control algorithms, and so forth.

In one or more embodiments, the block diagram schematic 200 includes an audio input/processor 211. The audio input/processor 211 can include hardware, executable code, and speech monitor executable code in one embodiment. The audio input/processor 211 can include, stored in memory 206, basic speech models, trained speech models, or other modules that are used by the audio input/processor 211 to receive and identify voice commands that are received with audio input captured by an audio input device. In one embodiment, the audio input/processor 211 can include a voice recognition engine. Regardless of the specific implementation utilized in the various embodiments, the audio input/processor 211 can access various speech models to identify speech commands in one or more embodiments.

The audio input/processor 211 is operable as an audio capture device to receive and capture audio input from a source, such as a person, authorized user, plurality of persons within an environment 212 about the electronic device 120. The audio input/processor 211 can include hardware, executable code, and speech monitor executable code in one embodiment.

The audio input/processor 211 can be operable with one or more predefined authentication references stored in memory 206. In one or more embodiments, the audio input/processor 211 can receive and identify voice commands that are received with audio input captured by an audio input device. In one embodiment, the audio input/processor 211 can include a voice recognition engine. Regardless of the specific implementation utilized in the various embodiments, the audio input/processor 211 can access various speech models stored with the predefined authentication references to identify speech commands.

In one embodiment, the audio input/processor 211 is configured to implement a voice control feature that allows the electronic device 120 to function as a voice assistant device, which may be configured as a voice assistant engine. In one or more embodiments, the voice assistant engine is a digital assistant using voice recognition, speech synthesis, and natural language processing to receive audio input comprising a voice command from a source, determine the appropriate response to the voice command, and then deliver the response in the form of audio output in response to receiving the audio input from the source. When so configured, a user can cause the emanation of the audio input from their mouth to cause the one or more processors 205 of the electronic device 120 to execute a control operation.

Various sensors 213 can be operable with the one or more processors 205. A first example of a sensor that can be included with the various sensors 213 is a touch sensor 210. The electronic device 120 can include one or more touch sensors, each of which can include a capacitive touch sensor, an infrared touch sensor, resistive touch sensors, or another touch-sensitive technology.

Another example of a sensor 213 is a geo-locator that serves as a location detector 214. In one embodiment, location detector 214 determines location data of the electronic device 120. Location can be determined by capturing the location data from a constellation of one or more earth orbiting satellites, or from a network of terrestrial base stations to determine an approximate location. The location detector 214 may also be able to determine location by locating or triangulating terrestrial base stations of a traditional cellular network, such as a CDMA network or GSM network, or from other local area networks, such as Wi-Fi networks.

Another example of a sensor 213 suitable for inclusion with the electronic device 120 include one or more motion sensors 224 that are operable to determine an orientation and/or movement of the electronic device 120 in three-dimensional space. Illustrating by example, the one or more motion sensors 224 can include an accelerometer, gyroscopes, or other device to detect device orientation and/or motion of the electronic device 120.

Another example of a sensor 213 is a force sensor. Where included, the force sensor can take various forms. For example, in one embodiment, the force sensor comprises resistive switches or a force switch array configured to detect contact with either the display or the housing of an electronic device. In another embodiment, the force sensor can be capacitive. In yet another embodiment, piezoelectric sensors can be configured to sense force as well.

An image processing system 216 can be included in the electronic device 120 and can be operable with the one or more processors 205. The image processing system 216 can be operable with one or more image capture devices 208 and can process one or more image frames, whether captured while the image capture device 208 operates in a viewfinder mode, an image capture mode, a video capture mode, or other mode of operation.

Illustrating by example, in one or more embodiments the image processing system 216, in response to the image capture device 208 capturing at least one imager of multiple persons situated within the environment 212 of the electronic device 120, can identify one or more persons of the multiple persons being depicted wearing regionally traditional item of dress associated with a location determined by the location detector 214 when the at least one imager is captured and at least one person of the multiple persons failing to wear a corresponding regionally traditional item of dress associated with the location. When this happens, a cultural awareness engine 219 can use inputs from the various sensors to identify another culturally identifiable item of clothing associated with the culture.

Thereafter, the cultural awareness engine 219 can cause the user interface 204 to present a prompt 108 facilitating replacement of items of dress worn by the at least one person with another regionally traditional item of dress selected by the cultural awareness engine 219. In one or more embodiments, the image processing system 216, in response to user input received by the user interface 204 interacting with the prompt 108, modify the at least one image to depict the another regionally traditional item of dress at a location within the at least one image corresponding to the at least one person. In other embodiments, the image processing system 216 automatically causes the at least one image to depict the at least one other person wearing the another culturally identifiable item of clothing when the at least one other person is an authorized user of the electronic device.

The one or more image capture devices 208 suitable for capturing at least one image can comprise one or more of a conventional image capture device, such as camera 226, a depth image capture device, and, optionally, one or more proximity sensors. Illustrating by example, in one embodiment, the one or more image capture devices 208 comprise a two-dimensional image capture device, such as that illustrated by camera 226. In one or more embodiments, the camera 226 comprises a two-dimensional Red-Green-Blue (RGB) image capture device.

The one or more image capture devices 208 can also include an infrared image capture device. Other types of image capture devices suitable for inclusion with the one or more image capture devices 208 will be obvious to those of ordinary skill in the art having the benefit of this disclosure.

In one or more embodiments, the image processing system 216 and the cultural awareness engine 219 can be operable with an environmental analyzer 217. The environmental analyzer 217 can be configured to process an image or depth scan of an object and determine whether the object matches predetermined criteria by comparing the image or depth scan to one or more predefined authentication references stored in memory 206. Working in conjunction with the environmental analyzer 217, in one or more embodiments the image processing system 216 and the cultural awareness engine 219 can be configured to identify non-uniform cultural attire conditions, including situations where at least one image depicts at least one person wearing a culturally identifiable item of clothing associated with a culture residing at a location where the at least one image is captured and at least one other person failing to wear any culturally identifiable items associated with the culture. Beneficially, this optical recognition performed by the image processing system 216 operating in conjunction with the environmental analyzer 217 allows, in response to user input received by a user interface 204 requesting alteration of the at least one image, the at least one image to be altered to depict the at least one other person wearing the another culturally identifiable item of clothing as previously described.

Other components 218 operable with the one or more processors 205 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers, the ultrasound transducers (where included), or other alarms and/or buzzers. The other components 218 can also include a mechanical output component such as vibrating or motion-based mechanisms.

The other components 218 can optionally include a barometer operable to sense changes in air pressure due to elevation changes or differing pressures of the electronic device 120. The other components 218 can also optionally include a light sensor 220 that detects changes in optical intensity, color, light, or shadow. In one or more embodiments, the light sensor 220 is operable to determine whether the environment 212 of the electronic device 120 is a low-light environment, one example of which occurs when the light density within the environment 212 is less than one hundred lux.

In one or more embodiments, the one or more processors 205 can define one or more process engines. Examples of these process engines include an artificial intelligence engine 221 and a context engine 223. Each engine can be a component of the one or more processors 205, operable with the one or more processors 205, defined by the one or more processors 205, and/or integrated into the one or more processors 205. Other configurations for these engines, including as software or firmware modules operable on the one or more processors 205, will be obvious to those of ordinary skill in the art having the benefit of this disclosure.

For instance, a context engine 223 can be operable with the various sensors to detect, infer, capture, and otherwise detect external conditions occurring within the environment 212 of the electronic device 120. For example, where included one embodiment of the context engine 223 determines assessed contexts and frameworks using adjustable algorithms of context assessment employing information, data, and events. These assessments may be learned through repetitive data analysis. Alternatively, a user may employ the user interface 204 to enter various parameters, constructs, rules, and/or paradigms that instruct or otherwise guide the context engine 223 in detecting, for example, at least one image depicting at least one person wearing a culturally identifiable item of clothing associated with a culture residing at a location where the at least one image is captured and at least one other person failing to wear any culturally identifiable items associated with the culture. The context engine 223 can comprise an artificial neural network or other similar technology in one or more embodiments.

Figure 3:
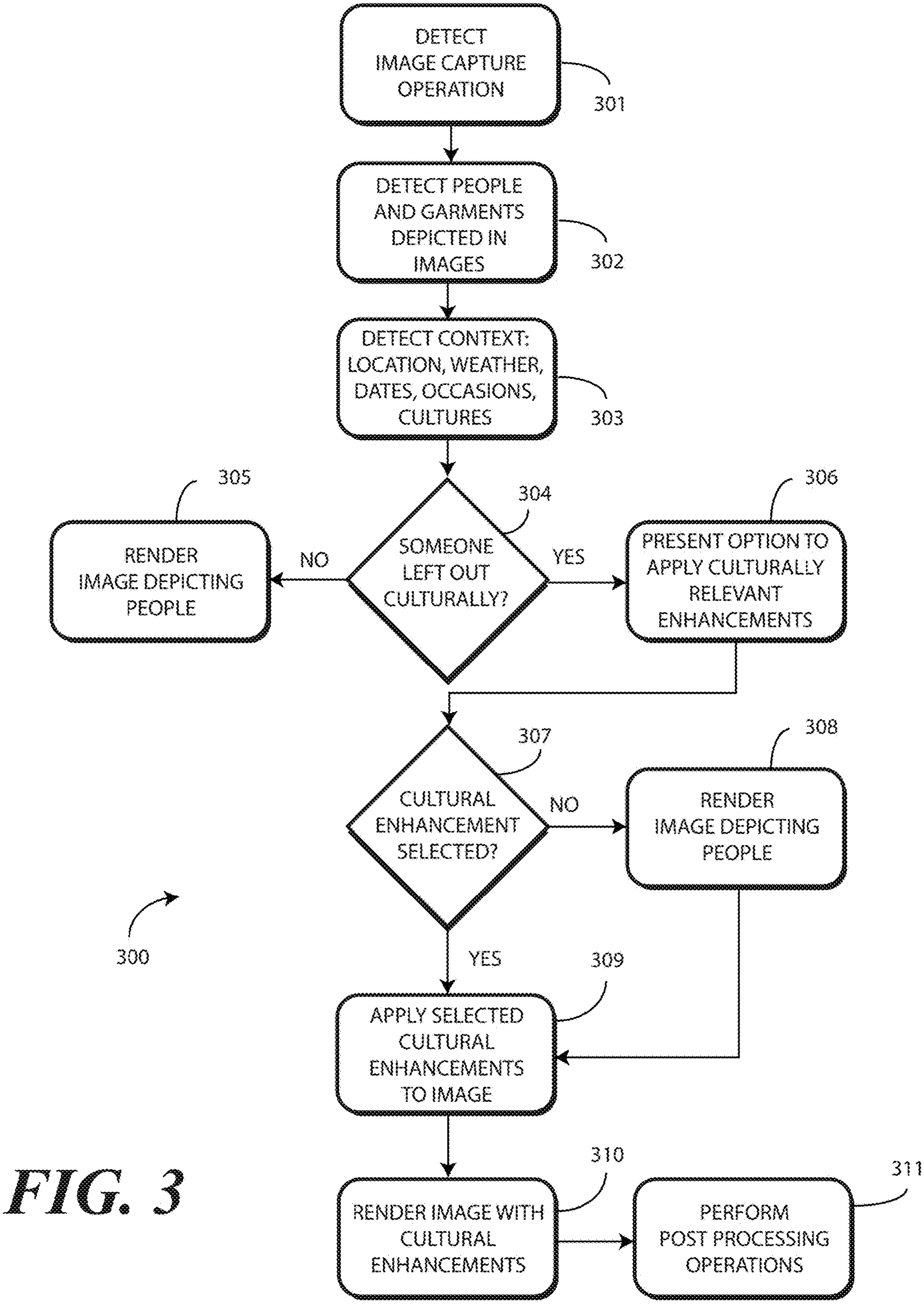
FIG. 3 illustrates another explanatory method in accordance with one or more embodiments of the disclosure.

Turning now to FIG. 3, illustrated therein is one explanatory method 300 for using the electronic device (120) of FIG. 2. Beginning at step 301, the method 300 captures, with an image capture device, one or more images of an environment of the electronic device. At step 302, the method 300 detects, using one or more processors, multiple persons being depicted in the one or more images.

At step 303, the method 300 further comprises detecting, with one or more sensors of the electronic device, a detected weather condition occurring in the environment of the electronic device, a detected date when the one or more images are being captured, and/or a detected geographic location where the one or more images are being captured. Decision 304 then determines, by the one or more processors, whether at least one person of the multiple persons is depicted wearing a culture heritage garment while at least one other person of the multiple persons fails to wear a corresponding culture heritage garment. If not, step 305 renders the captured image.

Figure 4:
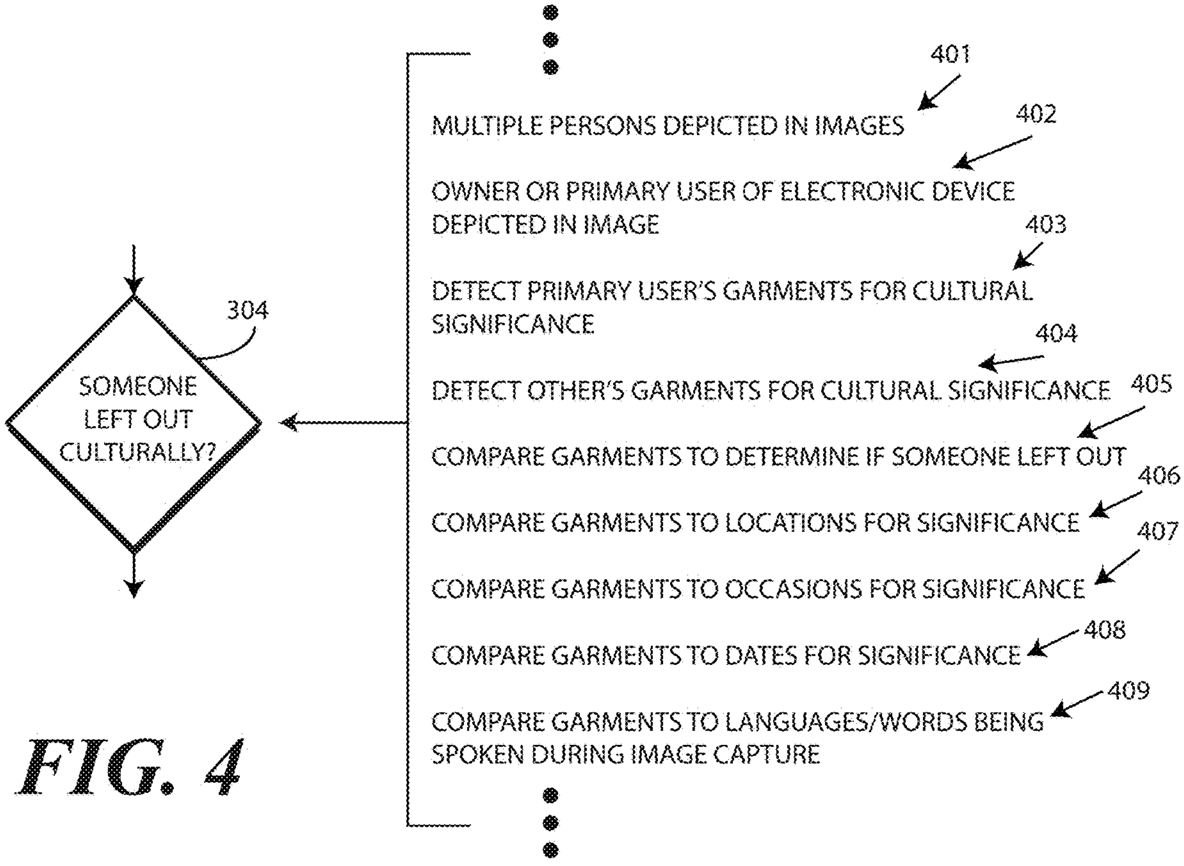
FIG. 4 illustrates one or more methods steps in accordance with one or more embodiments of the disclosure.

Decision 304 can be performed in a variety of ways. Turning briefly to FIG. 4, illustrated therein are some of the factors that can be considered when making decision 304.

FIG. 4 shows a decision-making process for determining, at decision 304, whether at least one person in a group is depicted wearing a culture heritage garment while another person fails to wear a corresponding garment. This process is important for the system's ability to enhance images based on cultural and environmental contextualization.

In FIG. 4, each reference designator that begins with a "4" references a factor that can be used to make decision 304, alone or in combination. As noted above, in one or more embodiments decision 304 determines whether at least one person of the multiple persons is depicted wearing a culture heritage garment while at least one other person of the multiple persons fails to wear a corresponding culture heritage garment.

In one or more embodiments, a factor can comprise the detection of multiple persons 401 depicted in images. Where included, this factor involves identifying all individuals present in the captured image, which is necessary for subsequent analysis of attire.

Another factor can comprise identifying the owner or primary user 402 of the electronic device depicted in the image. As noted above, in some embodiments the prompt of step (306) of FIG. 3 is presented only when the at least one person failing to wear the cultural heritage garment, comprises an authorized user of the electronic device. In other embodiments, the prompt is presented only when the at least one other person wearing the cultural heritage garment is an authorized user of the electronic device. Accordingly, this identification helps in personalizing the image enhancement process, as the primary user's attire may be prioritized for analysis and potential modification.

In one or more embodiments, a factor used in decision 304 can include the primary user's garments for cultural significance 403. In one or more embodiments, this involves analyzing the attire of the primary user to determine if the clothing aligns with the cultural context of the image. The cultural significance of the garments is assessed based on predefined cultural attire associated with the location or event.

Similarly, decision 304 can be based upon analyzing other individuals' garments for cultural significance 404. This ensures that the attire of all individuals in the image is evaluated for cultural relevance, allowing the system to identify any discrepancies in cultural attire among the group.

Decision 304 can compare the garments to determine if someone is left out culturally 405. In one or more embodiments, this comparison involves assessing whether any individual in the image is not wearing attire that corresponds to the cultural context, which could result in a visual disconnect within the group.

Context of where the image is captured can be used as well in making decision 304. Illustrating by example, decision 304 can consider a comparison of garments to locations 406 for significance. This can involve analyzing whether the attire matches the cultural expectations of the geographic location where the image was captured. This can be important for ensuring that the attire is appropriate for the specific cultural setting.

Garments can also be compared to occasions 407 for significance. This involves determining if the attire aligns with the cultural norms of the event or occasion depicted in the image, such as weddings, festivals, or other cultural gatherings.

Additionally, garments can be compared to dates 408 for significance. This involves assessing whether the attire is appropriate for the time of year or specific date, which may have cultural implications, such as traditional attire worn during certain holidays or seasons.

Where audio input is captured while the one or more images are captured, decision 304 can consider languages or words 409 being spoken during image capture. This involves analyzing any linguistic cues present in the image, such as spoken language or visible text, to further refine the cultural context and ensure that the attire is culturally appropriate.

These factors collectively enable the system to make an informed decision 304 on whether cultural attire adjustments are necessary, thereby enhancing the cultural authenticity and visual harmony of the captured image. Also, these factors are illustrative only as others will be obvious to those of ordinary skill in the art having the benefit of this disclosure.

Turning now back to FIG. 3, where decision 304 detects at least one person of the multiple persons being depicted wearing a culture heritage garment while at least one other person of the multiple persons fails to wear a corresponding culture heritage garment, step 306 comprises presenting, by the one or more processors on a user interface, a prompt facilitating cultural enhancement of the one or more images. In one or more embodiments, the prompt facilitates altering the one or more images to cause the at least one other person to be depicted wearing another culture heritage garment.

Decision 307 determines whether user input is received at the prompt to alter the image. If not, step 308 renders the captured image.

By contrast, step 309 comprises altering, in response to user input received at the prompt, the one or more images to cause the at least one other person to be depicted wearing the another culture heritage garment. In one or more embodiments, the another culture heritage garment matches the culture heritage garment. In one or more embodiments, the another culture heritage garment comprises headwear. In one or more embodiments, the culture heritage garment comprises a regionally traditional garment.

Figure 5:
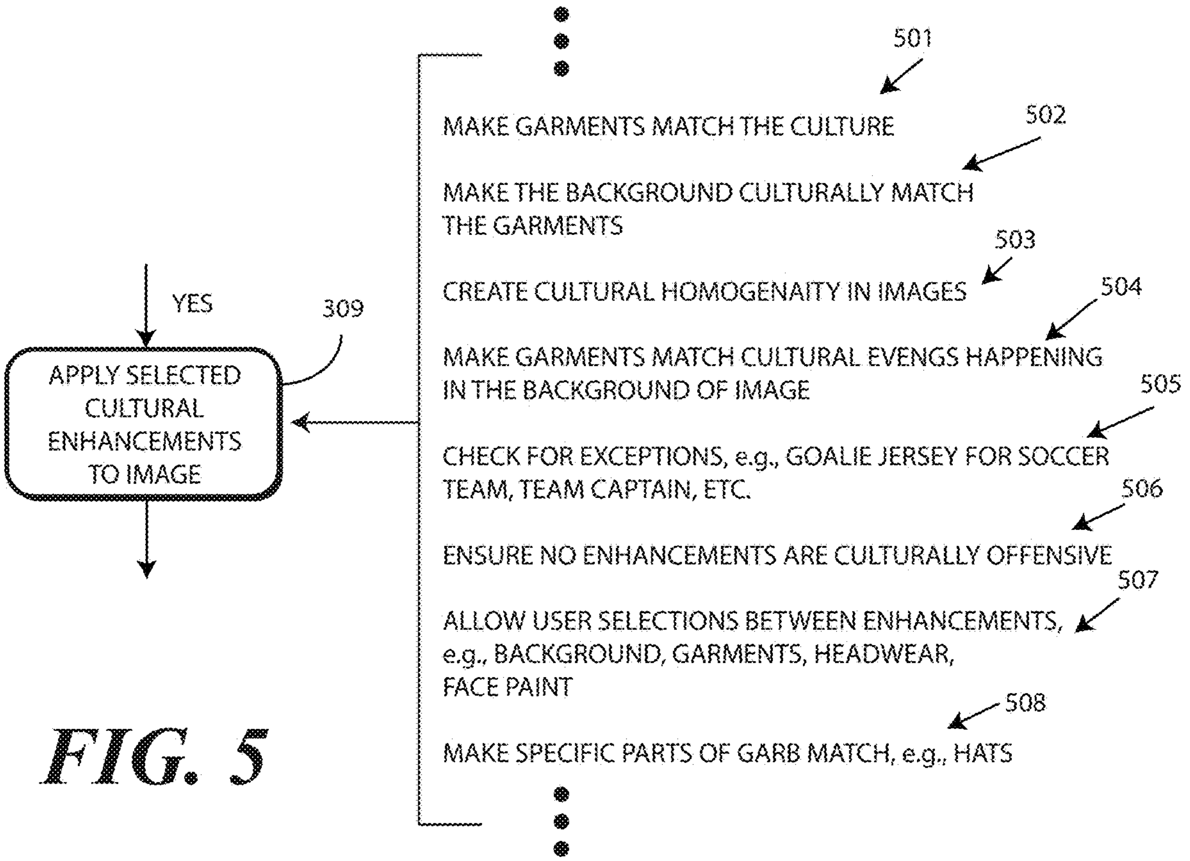
FIG. 5 illustrates one or more method steps in accordance with one or more embodiments of the disclosure.

Step 309 can be performed in a variety of ways. Turning briefly to FIG. 5, illustrated therein are several. Others will be obvious to those of ordinary skill in the art having the benefit of this disclosure.

FIG. 5 shows a series of processes for altering one or more images to depict a person who is not wearing a culture heritage garment as wearing one. These processes can be used alone or in combination.

The process at 501 involves making garments match the culture. This step ensures that the attire of individuals in the image aligns with the cultural context of the location or event. By doing so, the image reflects cultural authenticity, enhancing the viewer's perception of the event's cultural significance.

At 502, the process involves making the background culturally match the garments. This step ensures that the environment depicted in the image complements the cultural attire, creating a cohesive visual narrative. This technique enhances the overall aesthetic of the image, making the image more immersive and contextually accurate.

The process at 503 focuses on creating cultural homogeneity in images. This involves adjusting the attire of individuals to ensure uniformity in cultural representation. Such homogeneity can be particularly beneficial in group photos, where a consistent cultural theme is desired, thereby enhancing the visual harmony of the image.

At 504, the process involves making garments match cultural events happening in the background of the image. This step ensures that the attire is appropriate for the specific cultural activities depicted, such as festivals or ceremonies. This alignment enhances the narrative of the image, making the image more relevant and engaging.

The process at 505 includes checking for specific cases, such as a goalie jersey for a soccer team or a team captain's attire. This step ensures that certain roles or positions that traditionally require distinct attire are respected, maintaining the authenticity and integrity of the cultural representation.

At 506, the process ensures that no enhancements are culturally offensive. This involves verifying that the alterations made to the image do not inadvertently disrespect or misrepresent cultural symbols or attire. This step is important for maintaining cultural sensitivity and respect.

The process at 507 allows user selections between enhancements, such as background, garments, headwear, and face paint. This user-centric approach provides flexibility, enabling individuals to customize the image according to their preferences while maintaining cultural accuracy.

The process at 508 involves making specific parts of garb match, such as hats. This step ensures that individual elements of attire are consistent with the overall cultural theme, enhancing the detail and authenticity of the image.

Turning now back to FIG. 3, in one or more embodiments step 309 comprises superimposing the another culture heritage garment atop depictions of clothing worn by the at least one other person. In other embodiments, step 309 comprises replacing depictions of clothing worn by the at least one other person with other depictions of the another culture heritage garment.

In still other embodiments, step 309 alters the one or more images to depict the another culture heritage garment is performed using an artificial intelligence process. Illustrating by example, the artificial intelligence process can comprise analyzing the one or more images to identify contours and features of one or more individuals depicted in the one or more images, generating a digital model of the culture heritage garment based on the contours and the features, integrating the digital model into the one or more images to align with the contours and the features of the one or more individuals, and adjusting one or more of a color, a texture, and lighting of the digital model to seamlessly integrate with the one or more images, thereby creating a realistic depiction of the another culture heritage garment. Other steps suitable for such an artificial intelligence process will be obvious to those of ordinary skill in the art having the benefit of this disclosure.

Step 310 then renders the altered images on a user interface of the electronic device. Optional step 311 can perform post processing operations.

Illustrating by example, in step 310 of FIG. 3, after an image is altered to depict a person not wearing cultural garments as wearing cultural garments, several post-processing operations can be performed to enhance the overall quality and authenticity of the image. One such operation is color correction, which adjusts the hues and saturation to ensure that the added garments blend seamlessly with the existing elements of the image, making the alteration appear natural. This is particularly beneficial in scenarios where lighting conditions vary, such as outdoor events with changing sunlight, ensuring that the cultural garments do not appear out of place.

Another operation is noise reduction, which is useful in low-light environments where the image may have graininess, ensuring that the cultural garments maintain a smooth and clear appearance. Additionally, sharpening can be applied to enhance the details of the cultural garments, making intricate patterns and textures more pronounced, which is advantageous in images where the cultural attire is a focal point, such as in close-up portraits. These post-processing operations performed at optional step 311 collectively contribute to creating a cohesive and visually appealing image that accurately reflects the cultural context intended by the user.

Figure 6:
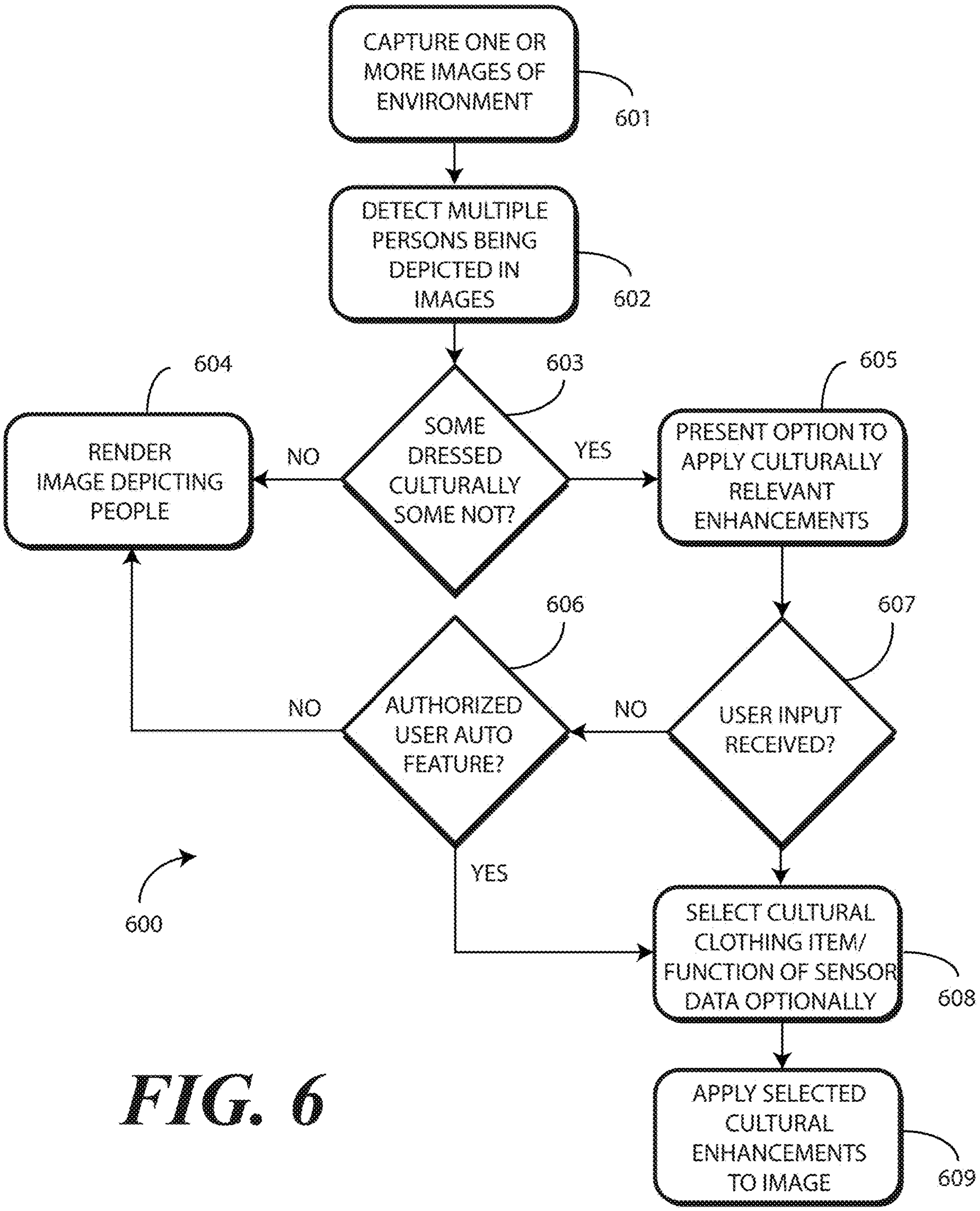
FIG. 6 illustrates still another explanatory method in accordance with one or more embodiments of the disclosure.

Turning now to FIG. 6, illustrated therein is still another method 600 in accordance with one or more embodiments of the disclosure. In one or more embodiments, the method 600 is performed in an electronic device and involves capturing, by one or more processors at step 601, at least one image depicting at least one person wearing a culturally identifiable item of clothing associated with a culture residing at a location. Step 602 determines whether multiple persons are depicted in the at least one image.

Decision 603 determines there is at least one other person failing to wear any culturally identifiable items associated with the culture. This decision 603 is important as it sets the foundation for identifying cultural discrepancies in attire among individuals depicted in the captured images. If there is not a cultural oddball detected by decision 603, the image is rendered at step 604.

However, as previously described one or more processors of the electronic device are responsible for analyzing the images to detect the presence of culturally identifiable clothing, which may include traditional garments, accessories, or other attire elements that are representative of a specific culture. This analysis performed at decision 603 is facilitated by advanced image recognition algorithms in one or more embodiments that can discern cultural attire based on predefined criteria stored within the device's memory or accessed from external databases.

A prompt or other user actuation target allowing modification of the at least one image can be presented at step 605. Step 608 can, in response to user input received by a user interface requesting alteration of the at least one image at decision 607, comprise causing, by the one or more processors, the at least one image to depict the at least one other person wearing the another culturally identifiable item of clothing.

If no user input is received, decision 606 determines whether a feature automatically causing the at least one image to depict the at least one other person wearing the another culturally identifiable item of clothing when the at least one other person is an authorized user of the electronic device. If so, step 608 can comprise causing, by the one or more processors, the at least one image to depict the at least one other person wearing the another culturally identifiable item of clothing.

In one or more embodiments, step 608 comprises identifying the another culturally identifiable item by accessing, with a communication device, one or more Internet-stored images and/or social media posts associated with the culture. In one or more embodiments, this involves the processors accessing a repository of cultural attire data, which may be stored locally on the device or retrieved from online sources such as social media platforms or cultural databases. The processors utilize this data to determine suitable attire that aligns with the cultural context of the image. This identification process can be enhanced by machine learning algorithms that continuously update the database with new cultural attire trends, ensuring that the suggestions remain relevant and accurate. The identified attire is then used to modify to the image, allowing individuals not wearing culturally appropriate clothing to be depicted in a manner that reflects the cultural setting accurately.

Thus, in one or more embodiments in response to user input received by a user interface requesting alteration of the at least one image, the method 600 comprises causing, by the one or more processors, the at least one image to depict the at least one other person wearing the another culturally identifiable item of clothing. This can involve presenting the user with options to alter the image through the device's user interface, which may include a touchscreen, voice commands, or other input methods.

Upon receiving user consent, the processors execute the alteration process, which may involve superimposing the identified cultural attire onto the image or replacing existing attire with the culturally appropriate garments. This alteration can be performed using sophisticated image editing techniques, including artificial intelligence-driven processes that ensure seamless integration of the new attire into the image. The result is an enhanced image that accurately represents the cultural context, providing a more authentic and meaningful depiction of the captured moment.

The one or more processors can also identify the another culturally identifiable item by accessing, with a communication device, one or more Internet-stored images and/or social media posts associated with the culture. This step leverages the connectivity capabilities of the electronic device to access a vast array of cultural data available online. By analyzing images and posts from social media platforms, the processors can identify current cultural attire trends and incorporate them into the attire suggestions. This dynamic approach ensures that the attire recommendations are not only culturally appropriate but also reflect contemporary fashion trends within the culture. The communication device, which may include Wi-Fi, cellular, or other network interfaces, facilitates this data retrieval process, enabling the device to maintain an up-to-date database of cultural attire.

The one or more processors can even automatically cause the at least one image to depict the at least one other person wearing the another culturally identifiable item of clothing when the at least one other person is an authorized user of the electronic device. This feature provides a personalized experience for users, allowing the device to automatically apply cultural attire enhancements for authorized users without requiring manual input. The processors utilize user authentication mechanisms, such as biometric recognition or user profiles, to identify authorized users and apply the attire modifications accordingly. This automation streamlines the image enhancement process, ensuring that authorized users can effortlessly achieve culturally accurate depictions in their photographs. The integration of user authentication with cultural attire enhancement represents a significant advancement in personalized digital photography, offering users a seamless and culturally sensitive imaging experience.

At step 609, the background of the image can be modified to culturally match the attire and context of the individuals depicted, thereby enhancing the overall cultural authenticity and visual coherence of the image. This modification process can involve analyzing the cultural context of the image, including the location, event, and attire of the individuals, and then selecting or generating a background that aligns with these cultural elements.

For instance, if the image depicts individuals in traditional Japanese attire, the background can be altered to include elements such as cherry blossoms or a Shinto shrine, which are culturally significant and enhance the thematic consistency of the image. Similarly, for an image featuring individuals in traditional Indian attire, the background could be modified to include elements like a Diwali festival scene or a traditional Indian palace, thereby reinforcing the cultural narrative. These modifications are achieved through advanced image processing techniques, which may involve the use of artificial intelligence to seamlessly integrate the new background with the existing elements of the image, ensuring that lighting, color, and texture are adjusted to create a realistic and culturally appropriate depiction.

Figure 7:
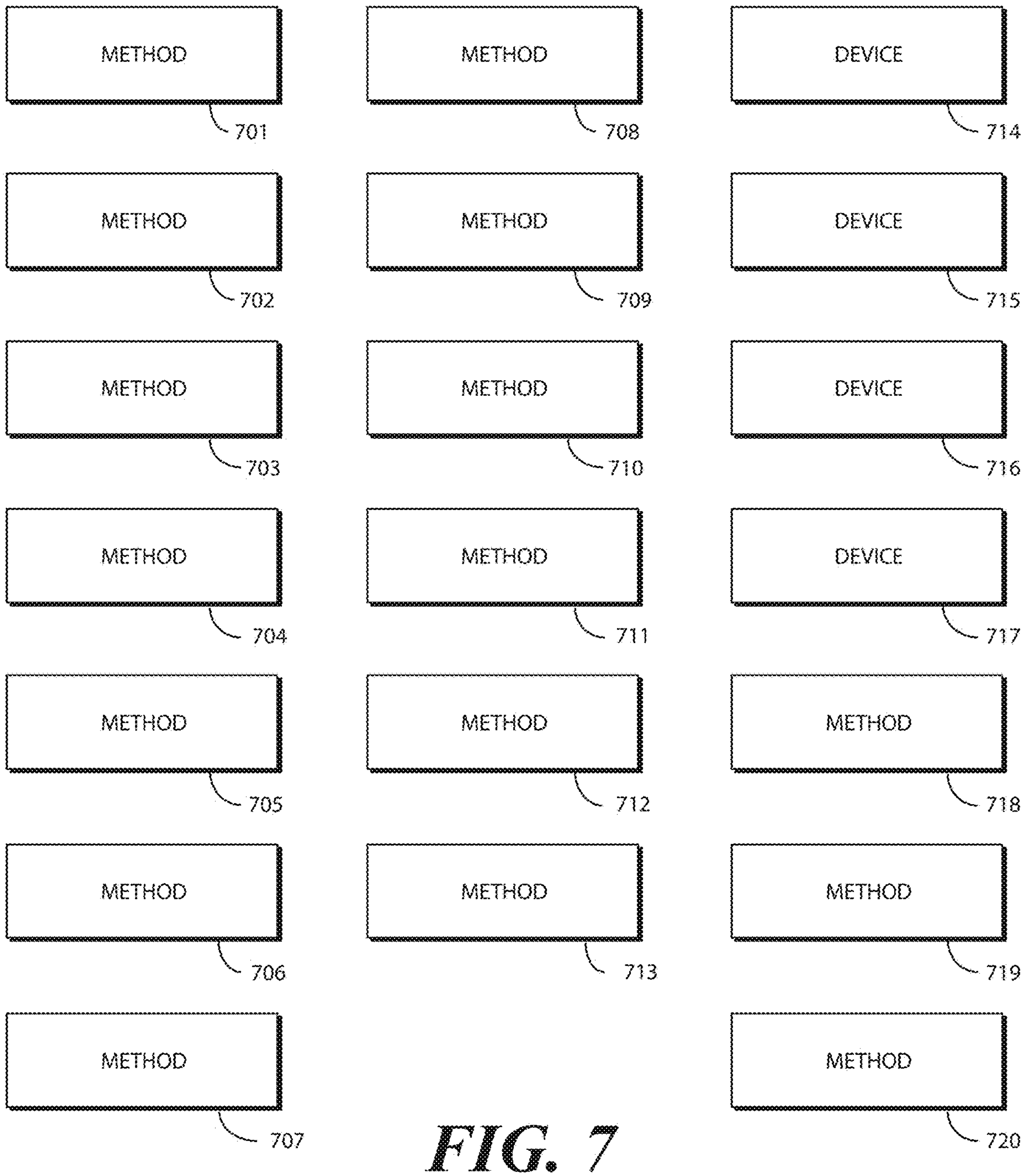
FIG. 7 illustrates one or more embodiments of the disclosure.

Turning now to FIG. 7, illustrated therein are various embodiments of the disclosure. The embodiments of FIG. 7 are shown as labeled boxes in FIG. 7 due to the fact that the individual components of these embodiments have been illustrated in detail in FIGS. 1-6, which precede FIG. 7. Accordingly, since these items have previously been illustrated and described, their repeated illustration is no longer essential for a proper understanding of these embodiments. Thus, the embodiments are shown as labeled boxes.

At 701, a method in an electronic device comprises capturing, with an image capture device, one or more images of an environment of the electronic device. At 701, the method comprises detecting, using one or more processors, multiple persons being depicted in the one or more images.

At 701, the method comprises determining, by the one or more processors, at least one person of the multiple persons being depicted wearing a culture heritage garment while at least one other person of the multiple persons fails to wear a corresponding culture heritage garment. At 701, the method comprises presenting, by the one or more processors on a user interface, a prompt facilitating cultural enhancement of the one or more images.

At 702, the prompt of 701 facilitates altering the one or more images to cause the at least one other person to be depicted wearing another culture heritage garment. At 703, the one or more processors of 702 alter, in response to user input received at the prompt, the one or more images to cause the at least one other person to be depicted wearing the another culture heritage garment.

At 704, the another culture heritage garment of 703 matches the culture heritage garment. At 705, the another culture heritage garment of 704 comprises headwear. At 706, the culture heritage garment of 704 comprises a regionally traditional garment.

At 707, the one or more images of 703 are captured while the image capture device is operating in a preview mode of operation. At 708, the altering of 703 comprises superimposing the another culture heritage garment atop depictions of clothing worn by the at least one other person.

At 709, the altering of 703 comprises replacing depictions of clothing worn by the at least one other person with other depictions of the another culture heritage garment. At 710, the alteration of the one or more images of 708 to depict the another culture heritage garment is performed using an artificial intelligence process. At 710, the artificial intelligence process comprises analyzing the one or more images to identify contours and features of one or more individuals depicted in the one or more images, generating a digital model of the culture heritage garment based on the contours and the features, integrating the digital model into the one or more images to align with the contours and the features of the one or more individuals, and adjusting one or more of a color, a texture, and lighting of the digital model to seamlessly integrate with the one or more images, thereby creating a realistic depiction of the another culture heritage garment.

At 711, the method of 710 further comprises detecting, with one or more sensors of the electronic device, a detected weather condition occurring in the environment of the electronic device, a detected date when the one or more images are being captured, and/or a detected geographic location where the one or more images are being captured. At 711, the artificial intelligence process further comprises selecting the another culture heritage garment as a function of one or more of the detected weather conditions, the detected date, the detected geographic location, or detected items depicted in a background of the one or more images.

At 712, the prompt of 701 is presented only when the at least one person comprises an authorized user of the electronic device. At 713, the prompt of 701 is presented only when the at least one other person is an authorized user of the electronic device.

At 714, an electronic device comprises a user interface, an image capture device configured to capture at least one image of multiple persons situated within an environment of the electronic device, a location detector configured to determine a location of the electronic device when the at least one image is captured, and one or more processors operable with the image capture device, the location detector, and the user interface. At 714, when the one or more processors identify one or more persons of the multiple persons being depicted wearing regionally traditional item of dress associated with the location and at least one person of the multiple persons failing to wear a corresponding regionally traditional item of dress associated with the location the one or more processors cause the user interface to present a prompt facilitating replacement of items of dress worn by the at least one person with another regionally traditional item of dress.

At 715, the regionally traditional item of dress and the another regionally traditional item of dress of 714 are the same. At 716, the regionally traditional item of dress of 714 comprises a combination of headwear and neckwear. At 717, the one or more processors of 714, in response to user input received by the user interface interacting with the prompt, modify the at least one image to depict the another regionally traditional item of dress at a location within the at least one image corresponding to the at least one person.

At 718, a method in an electronic device comprises receiving, by one or more processors, at least one image depicting at least one person wearing a culturally identifiable item of clothing associated with a culture residing at a location where the at least one image is captured and at least one other person failing to wear any culturally identifiable items associated with the culture. At 718, the method comprises identifying, by the one or more processors, another culturally identifiable item of clothing associated with the culture.

At 718, in response to user input received by a user interface requesting alteration of the at least one image, the method comprises causing, by the one or more processors, the at least one image to depict the at least one other person wearing the another culturally identifiable item of clothing.

At 719, the one or more processors of 718 identify the another culturally identifiable item by accessing, with a communication device, one or more Internet-stored images and/or social media posts associated with the culture. At 720, the one or more processors of 718 automatically cause the at least one image to depict the at least one other person wearing the another culturally identifiable item of clothing when the at least one other person is an authorized user of the electronic device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, in various embodiments of the electronic device described, the user interface, image capture device, location detector, and processors can be configured in multiple ways to enhance adaptability and functionality. The user interface may be a touchscreen, a voice-activated system, or a combination of both, allowing for intuitive interaction with the user. The image capture device could range from a high-resolution camera to a multi-lens system capable of capturing images in different lighting conditions and angles, enhancing the device's ability to accurately identify cultural attire. The location detector might utilize GPS, Wi-Fi triangulation, or cellular network data to determine the geographic location with precision.

The processors could be designed to support advanced artificial intelligence algorithms, enabling real-time analysis and decision-making regarding attire adjustments. In some embodiments, the processors may be integrated with cloud-based services to access a broader database of cultural attire, ensuring the suggestions are up-to-date and culturally relevant. Additionally, the device could include sensors to detect environmental conditions such as temperature and humidity, further refining the selection of appropriate attire based on the detected location and weather. These variations allow the electronic device to be versatile and responsive to different user needs and environmental contexts, ensuring cultural consistency in the images captured.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:

capturing, with an image capture device, one or more images of an environment of the electronic device;

detecting, using one or more processors, multiple persons being depicted in the one or more images;

determining, by the one or more processors, at least one person of the multiple persons being depicted wearing a culture heritage garment while at least one other person of the multiple persons fails to wear a corresponding culture heritage garment; and presenting, by the one or more processors on a user interface, a prompt facilitating cultural enhancement of the one or more images;

wherein the prompt facilitates altering the one or more images to cause the at least one other person to be depicted wearing another culture heritage garment.

2. The method of claim 1, wherein the prompt facilitates replacement of attire being worn by the at least one person with the another culture heritage garment.

3. The method of claim 1, the one or more processors altering, in response to user input received at the prompt, the one or more images to cause the at least one other person to be depicted wearing the another culture heritage garment.

4. The method of claim 3, wherein the another culture heritage garment matches the culture heritage garment.

5. The method of claim 4, wherein the another culture heritage garment comprises headwear.

6. The method of claim 4, wherein the culture heritage garment comprises a regionally traditional garment.

7. The method of claim 3, wherein the one or more images are captured while the image capture device is operating in a preview mode of operation.

8. The method of claim 3, wherein the altering comprises superimposing the another culture heritage garment atop depictions of clothing worn by the at least one other person.

9. The method of claim 8, wherein:

alteration of the one or more images to depict the another culture heritage garment is performed using an artificial intelligence process, the artificial intelligence process comprising:

analyzing the one or more images to identify contours and features of one or more individuals depicted in the one or more images;

generating a digital model of the culture heritage garment based on the contours and the features;

integrating the digital model into the one or more images to align with the contours and the features of the one or more individuals;

and adjusting one or more of a color, a texture, and lighting of the digital model to seamlessly integrate with the one or more images, thereby creating a realistic depiction of the another culture heritage garment.

10. The method of claim 9, further comprising detecting, with one or more sensors of the electronic device, a detected weather condition occurring in the environment of the electronic device, a detected date when the one or more images are being captured, and/or a detected geographic location where the one or more images are being captured, wherein the artificial intelligence process further comprises selecting the another culture heritage garment as a function of one or more of the detected weather condition, the detected date, the detected geographic location, or detected items depicted in a background of the one or more images.

11. The method of claim 3, wherein the altering comprises replacing depictions of clothing worn by the at least one other person with other depictions of the another culture heritage garment.

12. The method of claim 1, wherein the prompt is presented only when the at least one person comprises an authorized user of the electronic device.

13. The method of claim 1, wherein the prompt is presented only when the at least one other person is an authorized user of the electronic device.

14. An electronic device, comprising:

a user interface;

an image capture device configured to capture at least one image of multiple persons situated within an environment of the electronic device;

a location detector configured to determine a location of the electronic device when the at least one image is captured; and one or more processors operable with the image capture device, the location detector, and the user interface;

wherein when the one or more processors identify one or more persons of the multiple persons being depicted wearing regionally traditional item of dress associated with the location and at least one person of the multiple persons failing to wear a corresponding regionally traditional item of dress associated with the location the one or more processors cause the user interface to present a prompt facilitating replacement of items of dress worn by the at least one person with another regionally traditional item of dress.

15. The electronic device of claim 14, wherein the regionally traditional item of dress and the another regionally traditional item of dress are the same.

16. The electronic device of claim 14, wherein the regionally traditional item of dress comprises a combination of headwear and neckwear.

17. The electronic device of claim 14, wherein the one or more processors, in response to user input received by the user interface interacting with the prompt, modify the at least one image to depict the another regionally traditional item of dress at a location within the at least one image corresponding to the at least one person.

18. A method in an electronic device, the method comprising:

receiving, by one or more processors, at least one image depicting at least one person wearing a culturally identifiable item of clothing associated with a culture residing at a location where the at least one image is captured and at least one other person failing to wear any culturally identifiable items associated with the culture;

identifying, by the one or more processors, another culturally identifiable item of clothing associated with the culture; and in response to user input received by a user interface requesting alteration of the at least one image, causing, by the one or more processors, the at least one image to depict the at least one other person wearing the another culturally identifiable item of clothing.

19. The method of claim 18, wherein the one or more processors identify the another culturally identifiable item by accessing, with a communication device, one or more Internet-stored images and/or social media posts associated with the culture.

20. The method of claim 18, wherein the one or more processors automatically cause the at least one image to depict the at least one other person wearing the another culturally identifiable item of clothing when the at least one other person is an authorized user of the electronic device.

* * * * *